US010152733B1

(12) United States Patent
Levy et al.

(10) Patent No.: US 10,152,733 B1
(45) Date of Patent: Dec. 11, 2018

(54) WIRELESS TRANSMISSION-TRIGGERED INCENTIVES DRIVING SOCIAL MEDIA ENGAGEMENT

(71) Applicant: UPSELL DIRECT LLC, Dover, DE (US)

(72) Inventors: Avery Levy, Longboat Key, FL (US); Barry Rudolph, Estes Park, CO (US)

(73) Assignee: Digiprint IP LLC, Longboat Key, FL (US)

( * ) Notice: Subject to any disclaimer, the term of this patent is extended or adjusted under 35 U.S.C. 154(b) by 0 days.

(21) Appl. No.: 15/666,845

(22) Filed: Aug. 2, 2017

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0277* (2013.01); *G06Q 30/0267* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2002/0178073 A1* | 11/2002 | Gravelle | ............... | G06Q 10/04 705/26.81 |
| 2008/0068131 A1* | 3/2008 | Cargonja | ............. | G06K 7/0008 340/10.1 |
| 2008/0189152 A1* | 8/2008 | Hara | ................... | G06F 17/3053 705/7.11 |
| 2009/0089175 A1* | 4/2009 | Platek | ................... | G06Q 10/08 705/26.1 |
| 2010/0198675 A1* | 8/2010 | Mockli | ............. | G06F 17/30047 705/14.26 |
| 2010/0280908 A1* | 11/2010 | Benz | ...................... | G06Q 30/02 705/14.71 |

(Continued)

OTHER PUBLICATIONS

PCT/US18/44872, Wireless Transmission-Triggered Incentives Driving Social Media Engagement, filed Aug. 1, 2018.

(Continued)

*Primary Examiner* — Matthew T Sittner
(74) *Attorney, Agent, or Firm* — Polsinelli LLP (57) ABSTRACT

Methods and systems for wireless transmission-based incentives driving social media engagement are provided. An incentive structure may be stored in a database in memory regarding one or more incentives each based on a defined benchmark of social media activity. Information associated with a wireless transmission-based tag may be via a wireless transmission reader. A product/service associated with the information read from the wireless transmission-based tag may be identified. Such identified product/service may further be associated with product/service-specific information stored in a product/service database. A template for a social media communication may be provided based on the product/service-specific information associated with the identified product/service. Such social media communication based on the template may be shared with one or more social networks. Activity related to the social media communication may then be detected as having met the defined benchmark. A notification may be sent to a user device associated with the user regarding the defined benchmark having been met.

20 Claims, 6 Drawing Sheets

(56) References Cited

U.S. PATENT DOCUMENTS

| | | | | |
|---|---|---|---|---|
| 2010/0332330 | A1* | 12/2010 | Goel | G06O 30/02 |
| | | | | 705/14.66 |
| 2011/0283185 | A1* | 11/2011 | Obasanjo | G06F 17/3089 |
| | | | | 715/243 |
| 2012/0030055 | A1* | 2/2012 | Chan | G06Q 30/08 |
| | | | | 705/26.3 |
| 2012/0158513 | A1* | 6/2012 | Schoen | G06O 30/0269 |
| | | | | 705/14.66 |
| 2012/0173248 | A1* | 7/2012 | Smith | G06Q 10/00 |
| | | | | 705/1.1 |
| 2013/0085803 | A1* | 4/2013 | Mauro | G06F 7/02 |
| | | | | 705/7.29 |
| 2013/0091147 | A1* | 4/2013 | Kim | G06Q 30/00 |
| | | | | 707/748 |
| 2013/0103537 | A1* | 4/2013 | Hewett | G06Q 30/0633 |
| | | | | 705/26.7 |
| 2013/0290203 | A1* | 10/2013 | Purves | G06Q 50/01 |
| | | | | 705/319 |
| 2013/0346302 | A1* | 12/2013 | Purves | G06Q 20/102 |
| | | | | 705/40 |
| 2014/0052617 | A1* | 2/2014 | Chawla | G06Q 20/12 |
| | | | | 705/39 |
| 2014/0130182 | A1* | 5/2014 | Yackanich | G06F 21/60 |
| | | | | 726/27 |
| 2015/0046793 | A1* | 2/2015 | Frenkel | G06F 17/30896 |
| | | | | 715/234 |
| 2015/0127421 | A1* | 5/2015 | Nakano | G06Q 30/0201 |
| | | | | 705/7.29 |
| 2015/0142583 | A1* | 5/2015 | Shapiro | G06Q 30/0271 |
| | | | | 705/14.67 |
| 2015/0200715 | A1* | 7/2015 | Oiwa | H04W 76/14 |
| | | | | 455/41.1 |
| 2015/0348070 | A1* | 12/2015 | Boettcher | G06Q 30/0203 |
| | | | | 705/7.32 |
| 2015/0371266 | A1* | 12/2015 | Young | G06F 17/30867 |
| | | | | 705/14.55 |
| 2016/0189174 | A1* | 6/2016 | Heath | G06Q 30/0201 |
| | | | | 705/7.29 |
| 2016/0203510 | A1* | 7/2016 | Pregueiro | G06Q 30/0255 |
| | | | | 705/14.45 |
| 2017/0221080 | A1* | 8/2017 | Mauro | G06F 7/02 |
| 2017/0228831 | A1* | 8/2017 | Sutton-Shearer | G06Q 50/01 |
| 2017/0257455 | A1* | 9/2017 | McEvilly | G06Q 30/0261 |

OTHER PUBLICATIONS

PCT Application No. PCT/US218/044872 International Search Report and Written Opinion dated Aug. 31, 2018.

* cited by examiner

| User #123 | Twitter | Multiplier | Impact Score | Facebook | Multiplier | Impact Score | ... | YouTube | Multiplier | Impact Score |
|---|---|---|---|---|---|---|---|---|---|---|
| Likes/Favorites | NA | NA | NA | 10 | 0.50 | 5 | | 252 | 0.20 | 50.4 |
| Shares | NA | NA | NA | 2 | 1.00 | 2 | | 55 | 0.50 | 27.5 |
| Comments | NA | NA | NA | 4 | 1.00 | 4 | | 25 | 0.25 | 6.25 |
| Views | NA | NA | NA | NA | NA | | | 1200 | 0.10 | 120 |
| ... | | | | | | | | | | |
| Impact Score Total | | | 0 | | | 11 | | | | 204.15 |
| Reward 1 Threshold | | | 100 | | | 100 | | | | 100 |
| Reward 2 Threshold | | | 150 | | | 150 | | | | 150 |
| Reward 3 Threshold | | | 250 | | | 250 | | | | 250 |

WIRELESS TRANSMISSION-TRIGGERED INCENTIVES DRIVING SOCIAL MEDIA ENGAGEMENT

BACKGROUND OF THE INVENTION

1. Field of the Invention

The present invention generally relates to social media. More specifically, the present invention relates to wireless transmission-based incentives driving social media engagement.

2. Description of the Related Art

Presently, social media engagement around a product or service may be driven by a manufacturer, service provider, retailer, wholesaler, mail order cataloguer, electronic commerce (e-commerce) website, and other parties. While such engagement may generally provide accurate information in a timely manner, such engagement may not have the reach or influence compared to engagement by influential end-users. Such end-users may provide inaccurate information, however, or engage in a time-delayed way. Further, many products/services (e.g., clothing, household items) are still delivered and used in a real world setting. As such, the experience of having and using such products/services may be disconnected from the digital environment of social media.

There is, therefore, a need in the art for improved systems and methods for wireless transmission-based incentives driving social media engagement.

SUMMARY OF THE CLAIMED INVENTION

Embodiments of the present invention allow methods and systems for wireless transmission-based incentives driving social media engagement. Wireless transmission technologies associated with the present disclosure may include any type of wireless transmission capability known in the art, including, yet not limited to radio frequency identifiers (RFID), Bluetooth™, near field communications (NFC), iBeacon, CCD, MEMS or other wireless transmission techniques. An incentive structure may be stored in a database in memory regarding one or more incentives each based on a defined benchmark of social media activity. Information associated with a wireless transmission-based tag may be via a wireless transmission reader. A product/service associated with the information read from the wireless transmission-based tag may be identified. Such identified product/service may further be associated with product/service-specific information stored in a product/service database. A template for a social media communication may be provided based on the product/service-specific information associated with the identified product/service. Such social media communication based on the template may be shared with one or more social networks. Activity related to the social media communication may then be detected as having met the defined benchmark. A notification may be sent to a user device associated with the user regarding the defined benchmark having been met.

DETAILED DESCRIPTION

Embodiments of the present invention allow methods and systems for wireless transmission-based incentives driving social media engagement. An incentive structure may be stored in a database in memory regarding one or more incentives each based on a defined benchmark of social media activity. Information associated with a wireless transmission-based tag may be via a wireless transmission reader. A product/service associated with the information read from the wireless transmission-based tag may be identified. Such identified product/service may further be associated with product/service-specific information stored in a product/service database. A template for a social media communication may be provided based on the product/service-specific information associated with the identified product/service. Such social media communication based on the template may be shared with one or more social networks. Activity related to the social media communication may then be detected as having met the defined benchmark. A notification may be sent to a user device associated with the user regarding the defined benchmark having been met.

Figure 1:
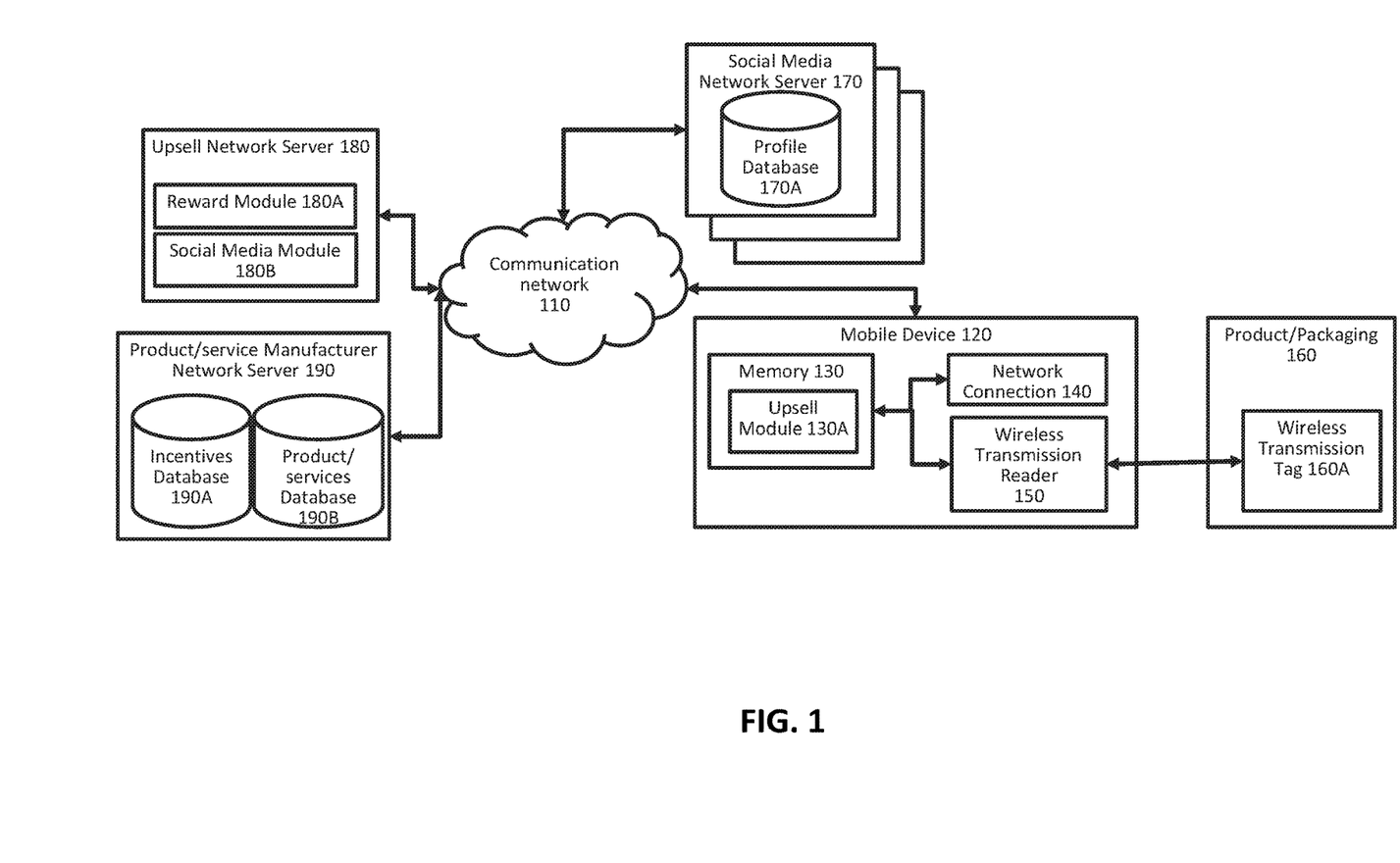
FIG. 1 illustrates a network environment in which a system for wireless transmission-based incentives driving social media engagement may be implemented.

FIG. 1 illustrates a network environment in which a system for wireless transmission-based incentives driving social media engagement may be implemented. Such a network environment may include a communication network 110, mobile device 120 (having memory 130, upsell module 130A, network connection 140, and wireless transmission reader 150), and various servers 180/190, including upsell network server 180 and product/service manufacturer network server 190. Upsell network server 180 may have a reward module 180A and a social media module 180B, while product/service manufacturer network server 190 may include an incentives database 190A and a product/service database 190B. Such servers 180/190 and databases 190A-B may be specific to a particular voice-based service, product/service manufacturer, service provider, retailer, wholesaler, mail order catalogue, electronic commerce website, or other third party servers and databases.

Communication network 110 may be a local, proprietary network (e.g., an intranet) and/or may be a part of a larger wide-area network. The communication network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communication network 100 allows for communication between the various components of network environment.

Users may use any number of different electronic user devices 120, including general purpose computers, mobile phones, smartphones, personal digital assistants (PDAs), portable computing devices (e.g., laptop, netbook, tablets), desktop computing devices, handheld computing device, intelligent home device, smart speaker, or any other type of computing device capable of communicating over communication network. Such user devices 120 may also be configured to access data from other storage media (memory 130), including local and remote databases (databases 190A-B) as may be appropriate in the case of downloaded services. User device 120 may include standard hardware computing components such as network interfaces 140 for communication over a communication network 110, media interfaces, non-transitory computer-readable storage (memory 130), and processors for executing instructions (upsell module 130A) that may be stored in memory 130.

In embodiments of the present invention, such user devices 120 may further be associated with a wireless transmission-based tag reader 150 capable of polling for wireless transmission-based tags 160A within a range of the wireless transmission reader 150. Upon identifying such a wireless transmission-based tag 160A, the wireless transmission reader 150 may further read information communicated by such wireless transmission-based tag 160A.

Servers 170/180/190 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Social media network server 170 may maintain a respective profile database 170A for storing all of the posts, activities, and contacts of each member of the respective social media network. Social media network server 170 may serve as a data source regarding social media activity. Such data may be made available and mined by the reward module 180A upon the user granting the required permissions.

The upsell network server 180 may house the reward module 180A and the social media module 180B. Execution of the upsell module 130A may be triggered when a wireless transmission-based tag 160A associated with a purchased product/service 160 is scanned. The wireless transmission-based tag 160A may contain a uniform resource locator (URL) that directs to product/service manufacturer network server 190. Such URL may further be associated with a query for information regarding the product/service 160.

Information regarding the wireless transmission-tagged product/service 160 may be retrieved from the relevant databases 190B for such purposes as identifying and offering related products/services. If the customer decides to purchase the offered product/service, such product/service may be added to a shopping cart for processing in accordance with electronic commercial transactions known in the art.

Multiple different related products/services may be offered in such fashion, whether sequentially or simultaneously.

Once the list of related ss/services is exhausted, the social media module 180B may be executed to present the customer with a plurality of different actions to promote the product/service via available social media networks in order to earn incentives or rewards related to the related products/services presented. The social media offers may be made after the original upsell offers are made. The social media incentive could also be presented simultaneously, such as listing the number of social media incentive points the customer would need to earn alongside the purchase price.

The product/service manufacturer network server 190 may contain an incentives database 190A and a products/services database 190B. The incentives database 190A may store information regarding incentive structures related to each product/service. The products/services database 190B may store information regarding products/services related to the wireless transmission-tagged product/service.

In an exemplary embodiment, a product/service 160 may be associated with a wireless transmission-based tag 160A that identifies the particular product/service 160 (e.g., brand, type, model). Such a wireless transmission-based tag 160A may be embedded or otherwise associated with the product/service 160, product/service packaging 160, manual, or other related materials. The wireless transmission-based tag 160A may communicate a set of information related to the product/service 160, including identifying information and one or more uniform resource locators (URLs) associated with the product/service 160. Each such URL may link to one of the related servers 180/190 (and databases 190A-B) (e.g., Amazon Alexa, Google Home) that may be used to implement wireless transmission-based incentives.

The wireless transmission-based tag 160A information read by the wireless transmission reader 150 may trigger execution of one or more software modules (e.g., upsell module 130A). Execution of such software modules may result in identification of the particular product/service 160 associated with the wireless transmission-based tag 160A and further, identification of other products/services related to the wireless transmission-tagged product/service 160. The identification of related products/services may rely in part on information stored at and retrieved from remote servers 180/190 and databases 190A-B. A product/service manufacturer network server 190 (e.g., associated with a retailer such as LL Bean, Nike, etc.) allow access to a database of products and/or services. Such databases 190B may provide a list of products and/or services related to the wireless transmission-tagged product/service 160. Such relationship may be identified directly by the particular product/service manufacturer (e.g., accessories commonly purchased with the wireless transmission-tagged product/service 160), or may be identified from purchase histories and trends related to the wireless transmission-tagged product/service 160. The user device 120 may receive one or more such lists from the remote servers 190, each identifying related products/services. The wireless transmission-tagged 160 may therefore be identified as being related to a number of such related products/services.

The social media module 180B may be prompted by the upsell module 130A. The social media module 180B may first determine if the user has previously granted the system access to their social media accounts. If the user has not granted access to at least one account, the social media module 180B may request access to the user's social media accounts on social network servers 170. Provided the user grants access to at least one of their social media accounts, the social media module 180B may retrieve the related product/service information from the product/service database 190B and the associated incentive structure from the incentives database 190A.

The incentives database 190A may be populated by the product/service manufacturer based upon their respective sales and marketing strategy. For example, the product/service manufacturer may have higher incentives with shorter time limits during the product/service launch in an effort to drive market penetration, and lower incentives with longer time limits for a product/service with a more mature position in the market.

The reward module 180A may be triggered by the upsell module 130A after completion of the social media module 180B in order to track the customer's progress towards reaching incentive milestones from social media activity initiated during execution of the social media module 180B. Each social media communication (e.g., posting an unboxing video on YouTube) initiated by the customer during execution of the social medial module 180B, may be assigned an impact score based on a variety of engagement activity (e.g., number of views/hits, likes, comments, retweets/reposts, shares, click-throughs) related to that communication.

The reward module 180A may calculate the activity's impact score and compares it to the threshold established in the incentives database 190A. If the impact score exceeds the incentive threshold, a reward notification is sent to the mobile device 120, and the inventive reward may be added to the shopping cart. If the activity's impact score has not exceeded the incentive threshold, the reward module 180A may determine if the time limit has expired for achieving the specified incentive. If the time limit has not been reached, the reward module 180A may return to calculating the impact score.

Figure 2:
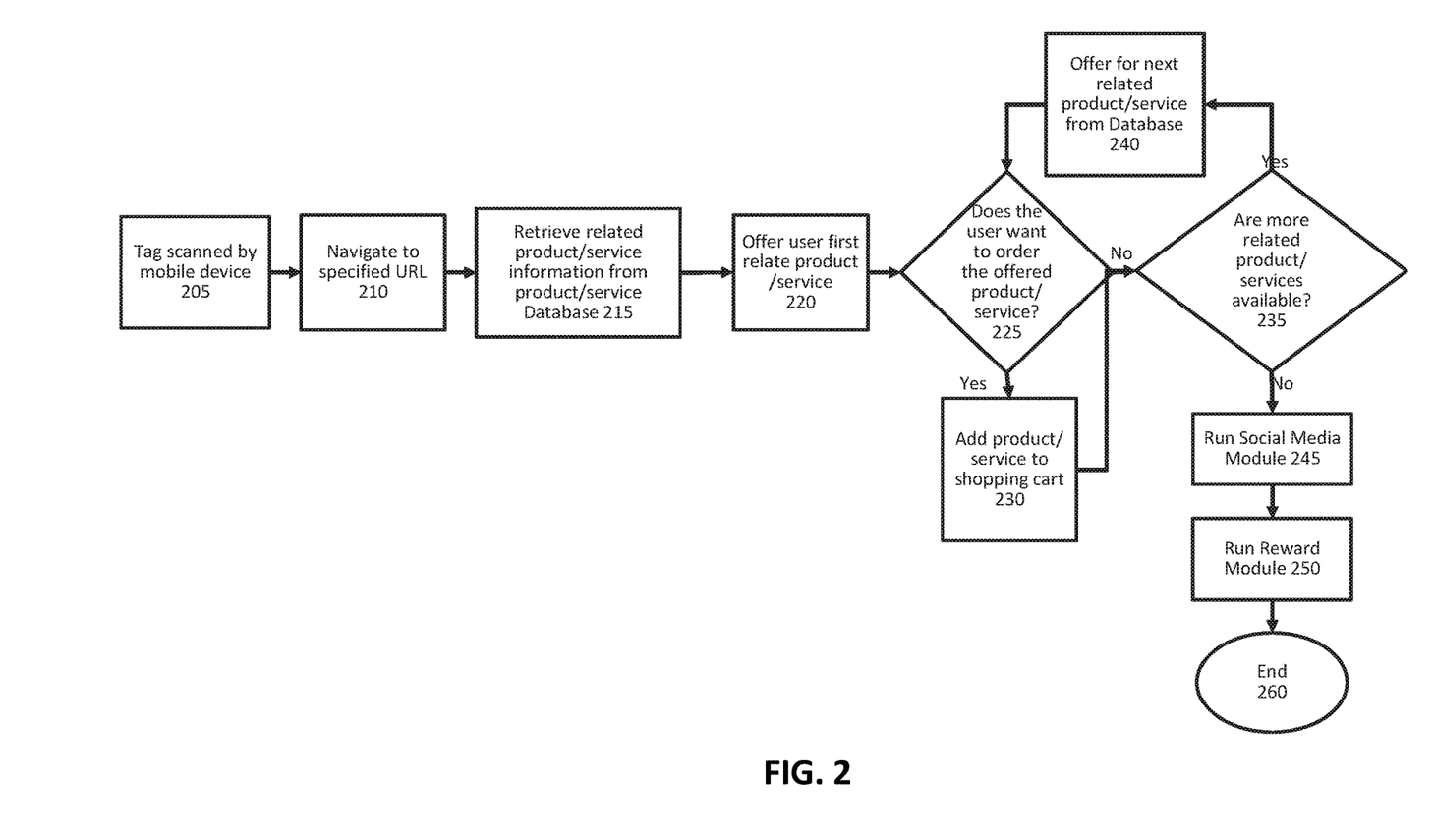
FIG. 2 is a flowchart illustrating an exemplary upselling method that may be performed in systems for triggering wireless transmission-based incentives driving social media engagement.

FIG. 2 is a flowchart illustrating an exemplary upselling method that may be performed in systems for triggering wireless transmission-based incentives driving social media engagement. Execution of the upsell module 130A may begin when a customer scans a wireless transmission-based tag 160A associated with a product in step 205. The wireless transmission-based tag 160A may contain a URL specified by the manufacturer that is specific to the tagged product/service 160, as well as data from the product/service database 190B regarding related products/services related to the product/service 160 specified by the wireless transmission-based tag 160A.

In step 215, information may be retrieved from the database regarding the tagged product/service 160 and in step 220, offered to the customer to purchase. If the customer decides to purchase the offered product/service in step 225, the item is added to the customer's shopping cart in step 230. Additional related products/services may be identified in step 235 and offered in step 240. Once the list of related product/service and/or services from the product/service and/or services database is exhausted, the social media module 180B may be executed in step 245 to present the customer with a plurality of social media actions they can take to promote their purchase via available social media networks in order to earn rewards. In this embodiment the social media offers may be made after the original upsell offers are made. The social media incentive could also be presented simultaneously, such as listing the number of social media incentive points the customer would need to earn alongside the purchase price. The rewards module 180A may then be executed in step 250, and the method may then end 260

Figure 3:
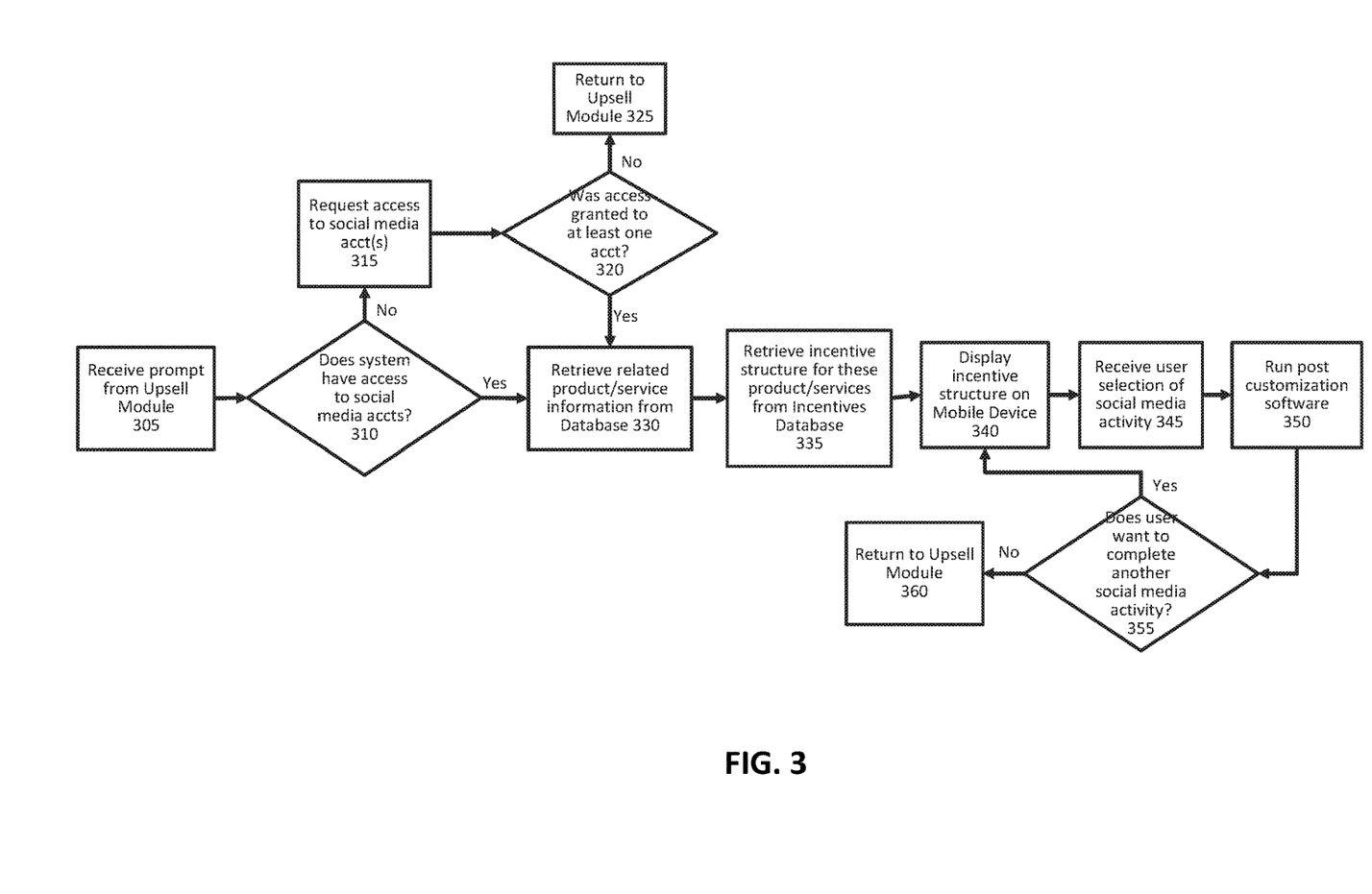
FIG. 3 is a flowchart illustrating an exemplary social media method that may be performed in systems for triggering wireless transmission-based incentives driving social media engagement.

FIG. 3 is a flowchart illustrating an exemplary social media method that may be performed in systems for triggering wireless transmission-based incentives driving social media engagement. The social media module 180B is prompted by the upsell module 130A in step 305. The social media module 180B first determines if the user has previously granted the system access to their social media accounts in step 310. If it has not been granted access to at least one account, the social media module 180B may request access to the user's social media accounts in step 315. If the user does not grant access to at least one account the social media module 180B returns to the upsell module 130A in step 325. Provided the user grants access to at least one of their social media accounts, the social media module 180B retrieves the related product/service information from the product/service database 190B in step 330 and the associated incentive structure from the incentives database 190A in step 335.

The incentive structure for each related product and/or service is then displayed on the mobile device in step 340. For example, the user purchased a pair of boots and the manufacturer is offering weatherproofing spray ($15.99), laces ($6.99), and polish ($9.99) as related products and/or services for upsell. This is a new boot design for the manufacturer so they are offering $1 per social media reward point earned with more points earned for creating a YouTube video than other social media platforms because their marketing research indicates that YouTube has more customers in their target demographic for these boots than Twitter or Facebook. The user selects which social media platform they want to share their purchase in step 345. This launches a window that is formatted for the social media platform with information (e.g., links, images) related to the product/service. The user has the ability to customize the messaging and imaging/video before posting in step 350. The user can repeat this process across multiple social media platforms in step 355. When the user has finished, the social media module 180B may return to the upsell module 130A.

Figure 4:
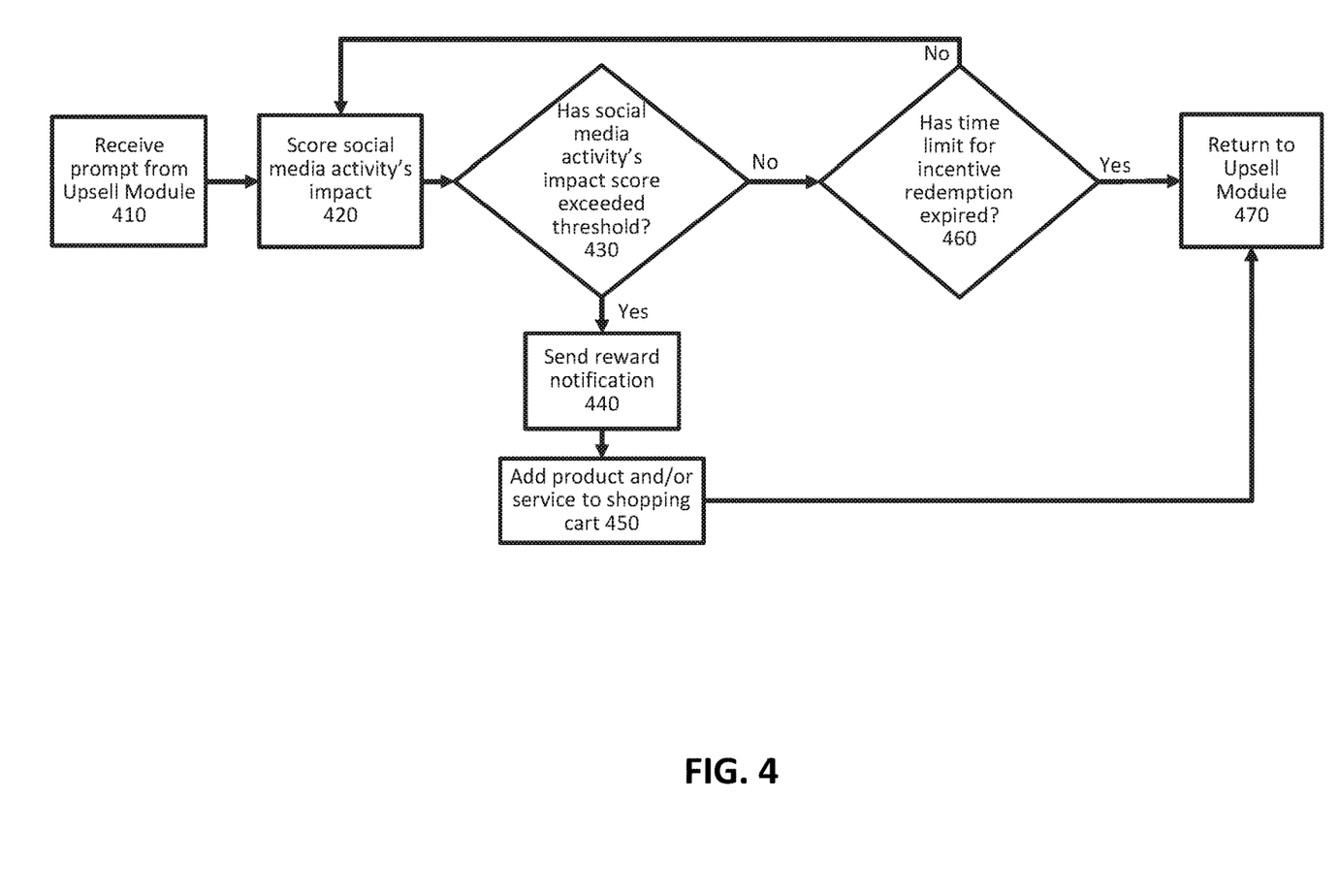
FIG. 4 is a flowchart illustrating an exemplary incentives method that may be performed in systems for triggering wireless transmission-based incentives driving social media engagement.

FIG. 4 is a flowchart illustrating an exemplary incentives method that may be performed in systems for triggering wireless transmission-based incentives driving social media engagement. In step 410, the reward module 180A may be triggered by the upsell module 130A after completion of the social media module 180B in order to track the customer's progress towards reaching incentive milestones from social media activity initiated during the social media module 180B. Each social media activity the customer initiated during the social medial module is scored for its impact in step 420. In step 430, the reward module 180A calculates the activity's impact score and compares it to the threshold established by in the incentives database 190A. If the impact score exceeds the incentive threshold, a reward notification is sent to the customer in step 440, and the inventive reward is added to the shopping cart in step 450. If the activity's impact score has not exceeded the incentive threshold, the reward module 180A determines if the time limit has expired for achieving the specified incentive in step 460. If the time limit has not been reached, the reward module 180A returns to calculating the impact score. If the time limit has been reached, the reward module 180A returns to the upsell module 130A in step 470.

Figure 5:
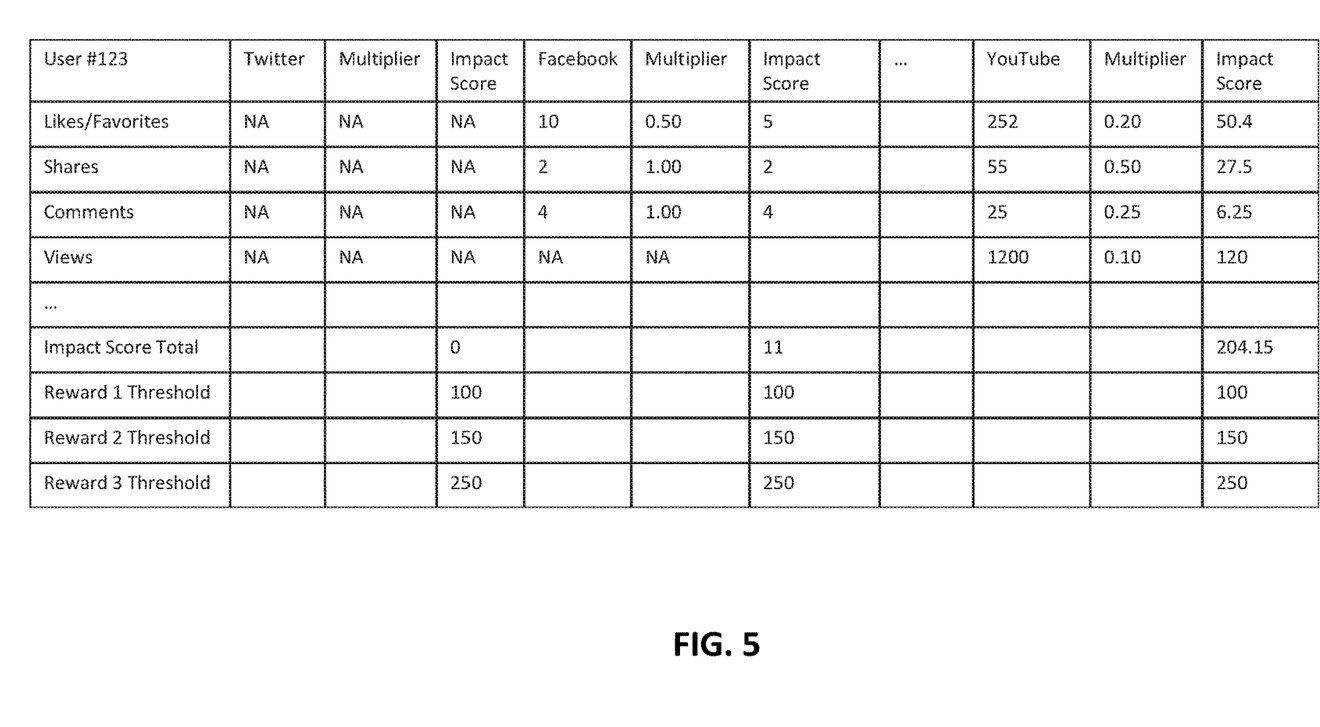
FIG. 5 illustrates an exemplary incentives database that may be performed in systems for triggering wireless transmission-based incentives driving social media engagement.

FIG. 5 illustrates an exemplary incentives database 190A that may be performed in systems for triggering wireless transmission-based incentives driving social media engagement. The incentives database 190A has a table for each user, in this example user number 123. Each row in the database represents one type of social media activity, such a likes, favorites, shares, comments, views, etc. Each social media platform, such as Twitter, Facebook, Instagram, YouTube, SnapChat, etc., has three columns. The first is the count of the social media activity for that row, such as "likes". The second column is the multiplier for this activity, that is multiplied by the count to get the impact score. For example, 10 likes on Facebook with a multiplier of 0.5 yields an impact score for that activity on that social media platform of 5. The multiplier may be the key variable determined by the product and/or service manufacturer based upon their desired social media marketing campaign. For example, the multipliers in this table are fairly high for Facebook activities. The product/service manufacturer in this example values the person to person recommendation that is achievable via Facebook more than other social media platforms. User #123 in this example posted an unboxing video that had greater impact than their Facebook activity. The impact score for each social media platform is totaled below.

Below the total impact score are the impact score thresholds at which User #123 may earn different rewards. In this example, reward 1 if the first upsell item offered from the products and/or services database, reward 2 is the second upsell item and reward 3 is the third. In this example the rewards are a pass fail system in which user #123 either earns the product and/or service reward or not, but the system could also be configured to have impact score translate to a certain dollar amount towards a rewards purchase price. Ideally, the method of calculating the impact score and the reward thresholds are visible to the user so they are incentivized to drive the impact score up by promoting the message. In this example, User #123 did not earn any rewards from their Twitter of Facebook activity, due to no activity and a low impact score respectively, while he did earn both reward 1 and reward 2 from his unboxing video on YouTube. The impact score calculation can include other variables, such as follower count, that are not shown here.

Figure 6:
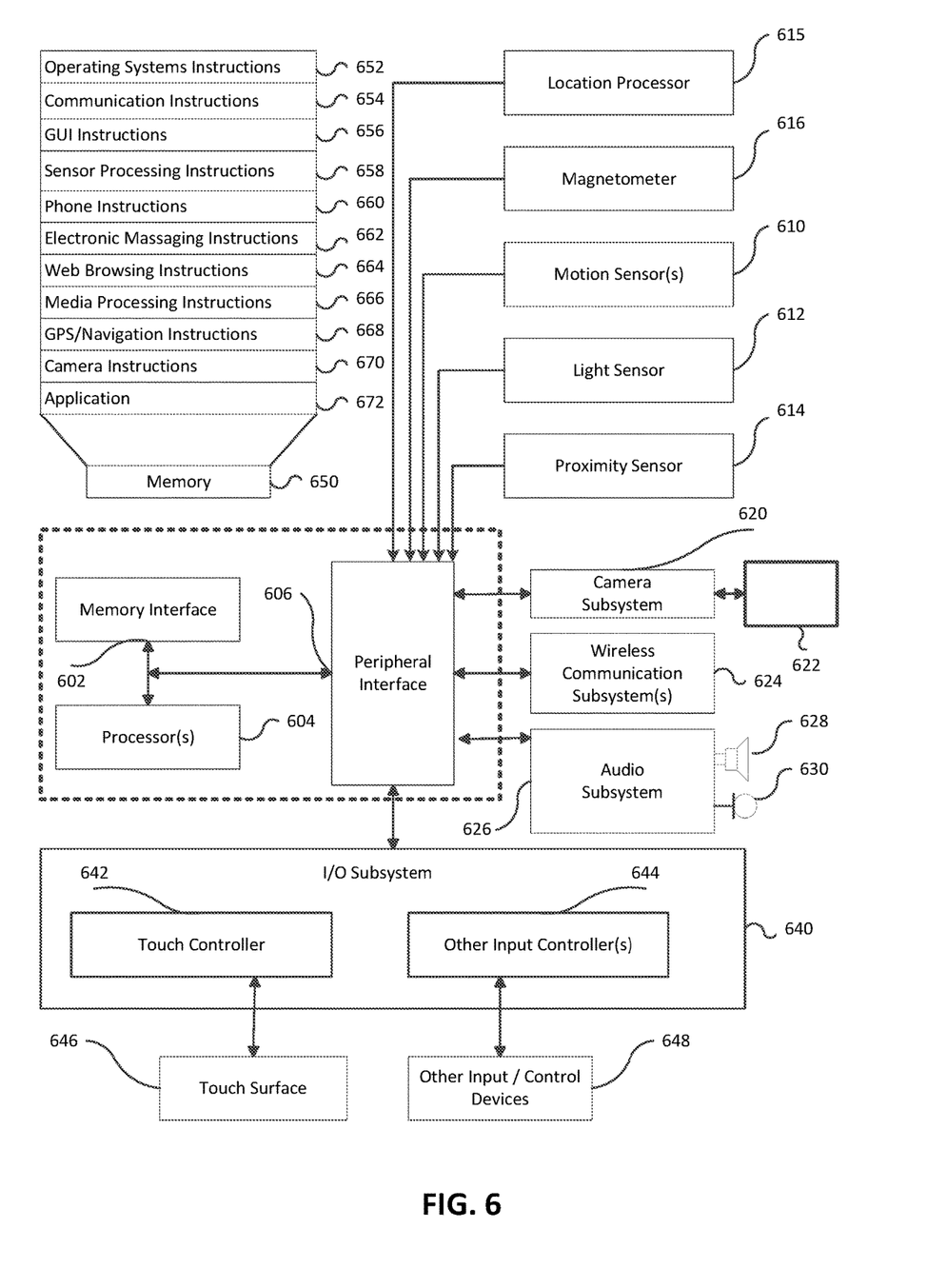
FIG. 6 illustrates a mobile device architecture that may be utilized to implement the various features and processes described herein.

FIG. 6 illustrates a mobile device architecture that may be utilized to implement the various features and processes described herein. Architecture 600 can be implemented in any number of portable devices including but not limited to smart phones, electronic tablets, and gaming devices. Architecture 600 as illustrated in FIG. 6 includes memory interface 602, processors 604, and peripheral interface 606. Memory interface 602, processors 604 and peripherals interface 606 can be separate components or can be integrated as a part of one or more integrated circuits. The various components can be coupled by one or more communication buses or signal lines.

Processors 604 as illustrated in FIG. 6 is meant to be inclusive of data processors, image processors, central processing unit, or any variety of multi-core processing devices. Any variety of sensors, external devices, and external subsystems can be coupled to peripherals interface 606 to facilitate any number of functionalities within the architecture 600 of the exemplar mobile device. For example, motion sensor 610, light sensor 612, and proximity sensor 614 can be coupled to peripherals interface 606 to facilitate orientation, lighting, and proximity functions of the mobile device. For example, light sensor 612 could be utilized to facilitate adjusting the brightness of touch surface 646. Motion sensor 610, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 606, such as a temperature sensor, a biometric sensor, or other sensing device to facilitate corresponding functionalities. Location processor 615 (e.g., a global positioning transceiver) can be coupled to peripherals interface 606 to allow for generation of geo-location data thereby facilitating geo-positioning. An electronic magnetometer 616 such as an integrated circuit chip could in turn be connected to peripherals interface 606 to provide data related to the direction of true magnetic North whereby the mobile device could enjoy compass or directional functionality. Camera subsystem 620 and an optical sensor 622 such as a charged coupled device (CCD) or a complementary metal-oxide semiconductor (CMOS) optical sensor can facilitate camera functions such as recording photographs and video clips.

Communication functionality can be facilitated through one or more communication subsystems 624, which may include one or more wireless communication subsystems. Wireless communication subsystems 624 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 624 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 624 may include hosting protocols such that the device may be configured as a base station for other wireless devices. Communication subsystems can also allow the device to synchronize with a host device using one or more protocols such as TCP/IP, HTTP, or UDP.

Audio subsystem 626 can be coupled to a speaker 628 and one or more microphones 630 to facilitate voice-enabled functions. These functions might include voice recognition, voice replication, or digital recording. Audio subsystem 626 in conjunction may also encompass traditional telephony functions.

I/O subsystem 640 may include touch controller 642 and/or other input controller(s) 644. Touch controller 642 can be coupled to a touch surface 646. Touch surface 646 and touch controller 642 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 646 may likewise be utilized. In one implementation, touch surface 646 can display virtual or soft buttons and a virtual keyboard, which can be used as an input/output device by the user.

Other input controllers 644 can be coupled to other input/control devices 648 such as one or more buttons, rocker switches, thumb-wheels, infrared ports, USB ports, and/or a pointer device such as a stylus. The one or more buttons (not shown) can include an up/down button for volume control of speaker 628 and/or microphone 630. In some implementations, device 600 can include the functionality of an audio and/or video playback or recording device and may include a pin connector for tethering to other devices.

Memory interface 602 can be coupled to memory 650. Memory 650 can include high-speed random access memory or non-volatile memory such as magnetic disk storage devices, optical storage devices, or flash memory. Memory 650 can store operating system 652, such as Darwin, RTXC, LINUX, UNIX, OS 6, ANDROID, WINDOWS, or an embedded operating system such as VxWorks. Operating system 652 may include instructions for handling basic system services and for performing hardware dependent tasks. In some implementations, operating system 652 can include a kernel.

Memory 650 may also store communication instructions 654 to facilitate communicating with other mobile computing devices or servers. Communication instructions 654 can also be used to select an operational mode or communication medium for use by the device based on a geographic location, which could be obtained by the GPS/Navigation instructions 668. Memory 650 may include graphical user interface instructions 656 to facilitate graphic user interface processing such as the generation of an interface; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes, camera instructions 670 to facilitate camera-related processes and functions; and instructions 672 for any other application that may be operating on or in conjunction with the mobile computing device. Memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for wireless transmission-based incentives driving social media engagement, the system comprising:
   a memory storing a database including an incentive structure providing one or more incentives, wherein each incentive is based on a defined benchmark of social media activity, the defined benchmark associated with a plurality of different types of activity each of which is associated with a different threshold;
   a wireless transmission reader that polls for wireless-transmission tags within a range and reads information associated with a wireless transmission-based tag associated with a physical item and identified within the range;

a processor that executes instructions stored in memory, wherein execution of the instructions by the processor:

identifies a product/service associated with the information read from the wireless transmission-based tag, wherein the identified product/service is associated with product/service-specific information stored in a product/service database;

provides a template for a social media communication to be shared with one or more social media networks, wherein the template is based on the product/service-specific information associated with the identified product/service;

assigns an impact score to the social media communication based on one or more detected activities of the plurality of different types of activities;

identifies that the one or more detected activities meets the defined benchmark based on the impact score associated with at least one of the different thresholds; and a communication network interface that sends a notification to a user device associated with a user regarding the defined benchmark having been met.

2. The system of claim 1, wherein the database is remote from the wireless transmission reader.

3. The system of claim 1, wherein the wireless transmission reader is located at a mobile device.

4. The system of claim 1, wherein the database further stores information regarding the one or more social media networks.

5. The system of claim 1, further comprising a screen that displays one or more options for social media engagement, wherein the template is based on a selected option from the display screen.

6. The system of claim 1, wherein the database further stores a plurality of different templates, each template associated with one or more displayed options.

7. The system of claim 1, wherein the processor executes further instructions to identify that a time limit associated with the one or more incentives has not yet expired.

8. A method for wireless transmission-based incentives driving social media engagement, the method comprising:

storing a database in a memory, the database including an incentive structure that provides one or more incentives, wherein each incentive is based on a defined benchmark of social media activity and the defined benchmark is associated with a plurality of different types of activity each of which is associated with a different threshold;

polling for wireless-transmission tags within a range of a wireless transmission reader;

reading information associated with a wireless transmission-based tag identified within the range, the information read via the wireless transmission reader;

identifying a product/service associated with the information read from the wireless transmission-based tag, wherein the identified product/service is associated with product/service-specific information stored in a product/service database;

providing a template for a social media communication to be shared with one or more social media networks, wherein the template is based on the product/service-specific information associated with the identified product/service;

assigning an impact score to the social media communication based on one or more detected activities of the plurality of different types of activities;

identifies that the one or more detected activities meets the defined benchmark based on the impact score associated with at least one of the different thresholds; and sending a notification to a user device associated with a user regarding the defined benchmark having been met.

9. The method of claim 8, wherein the database is remote from the wireless transmission reader.

10. The method of claim 8, wherein the wireless transmission reader is located at a mobile device.

11. The method of claim 8, further comprising storing information regarding the one or more social media networks in the database.

12. The method of claim 8, further comprising displaying one or more options for social media engagement on a display screen, wherein the template is based on a selected option from the one or more options displayed on the display screen.

13. The method of claim 8, further comprising storing information regarding a plurality of different templates in the database, each template associated with one or more displayed options.

14. The method of claim 8, further comprising executing further instructions to identify that a time limit associated with the incentive one or more incentives has not yet expired.

15. A non-transitory computer-readable storage medium, having embodied thereon a program executable by a processor to perform a method for wireless transmission-based incentives driving social media engagement, the method comprising:

storing a database in a memory, the database including an incentive structure that provides one or more incentives, wherein each incentive is based on a defined benchmark of social media activity and the defined benchmark is associated with a plurality of different types of activity each of which is associated with a different threshold;

polling for wireless-transmission tags within a range of a wireless transmission reader;

reading information associated with a wireless transmission-based tag identified within the range, the information read via the wireless transmission reader;

identifying a product/service associated with the information read from the wireless transmission-based tag, wherein the identified product/service is associated with product/service-specific information stored in a product/service database;

providing a template for a social media communication to be shared with one or more social media networks, wherein the template is based on the product/service-specific information associated with the identified product/service;

assigning an impact score to the social media communication based on one or more detected activities of the plurality of different types of activities;

identifies that the one or more detected activities meets the defined benchmark, wherein the defined benchmark is determined to have been met based on the assigned impact score; and sending a notification to a user device associated with a user regarding the defined benchmark having been met.

16. The non-transitory computer-readable storage medium of claim 15, wherein the database is remote from the wireless transmission reader.

17. The non-transitory computer-readable storage medium of claim 15, wherein the wireless transmission reader is located at a mobile device.

18. The non-transitory computer-readable storage medium of claim 15, the program further executable to store information regarding the one or more social media networks in the database.

19. The non-transitory computer-readable storage medium of claim 15, the program further executable to display one or more options for social media engagement on a display screen, wherein the template is based on a selected option from the one or more options displayed on the display screen.

20. The non-transitory computer-readable storage medium of claim 15, the program further executable to store information regarding a plurality of different templates in the database, each template associated with one or more displayed options.

* * * * *